Sept. 9, 1969  F. BOSCARINO  3,465,668
BEVERAGE DISPENSING APPARATUS
Filed Feb. 10, 1966

INVENTOR
FRANK BOSCARINO
BY
*Jerome Bauer*
ATTORNEY.

United States Patent Office 3,465,668
Patented Sept. 9, 1969

3,465,668
BEVERAGE DISPENSING APPARATUS
Frank Boscarino, East Northport, N.Y., assignor, by mesne assignments, to Universal Oil Products Company, Des Plaines, Ill., a corporation of Delaware
Filed Feb. 10, 1966, Ser. No. 526,620
Int. Cl. A47j *31/10, 31/54*
U.S. Cl. 99—282      11 Claims

ABSTRACT OF THE DISCLOSURE

A beverage producing apparatus having a boiler for heating a fluid and means for automatically dispensing the fluid when the same attains a predetermined temperature, with means to alternately dispense fluid manually when the same is desired, and including safety means to prevent the buildup of pressure.

---

This invention relates generally to a beverage producing and dispensing apparatus and more particularly pertains to a beverage producing apparatus for use in galleys employed in aircraft and the like.

It is highly desirable to make the operation of equipment utilized in aircraft galleys as fully automated as possible. Thus, the automation of the equipment minimizes the amount of time that a stewardess spends in tending to such apparatus thereby freeing her for more important duties. In particular, and in order to make their operation more efficient, beverage producing apparatuses of the type employed in aircraft galleys are provided with electrical timing circuits which are adapted to control the flow of the beverage. These circuits are operable to stop the flow of the beverage into an appropriate receptacle a predetermined interval of time after a beverage dispensing cycle has been initiated. However, these circuits are usually complex and they require components that add considerable weight and size to the apparatus. Accordingly, the desideratum of the present invention is to provide a beverage producing apparatus for use in an aircraft galley that is compact and lightweight and which is operable to terminate the dispensing cycle after a preselected volume of fluid has been dispensed rather than after a predetermined interval of time. Thus, the same identical volume of the beverage is insured for each operation.

Other objects and features of the present invention reside in the novel details of construction that provide a coffee brewing machine for use in aircraft galleys which includes novel safety means to prevent the build-up of pressure in the machine.

Figure 1:
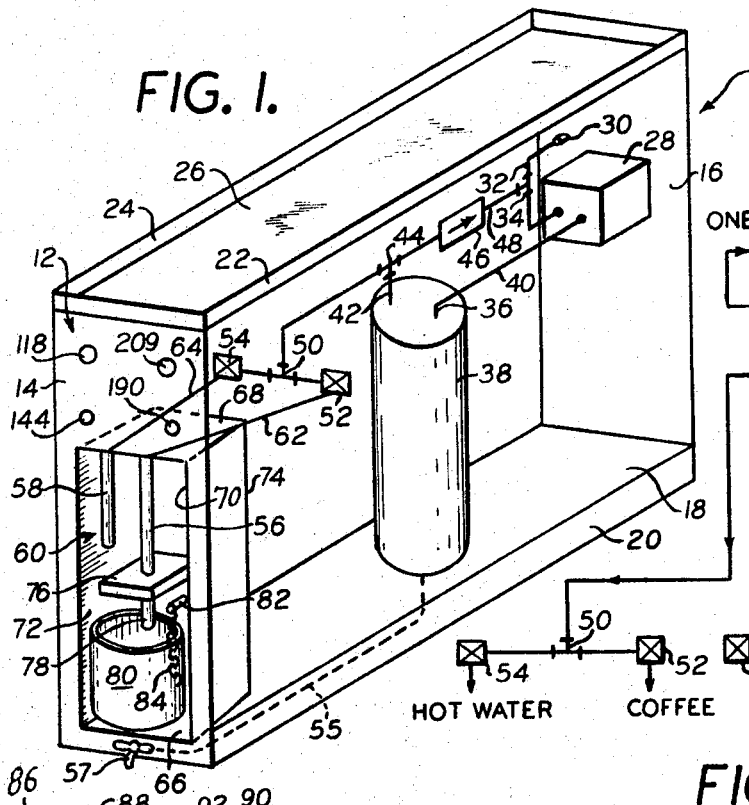
Figure 2:
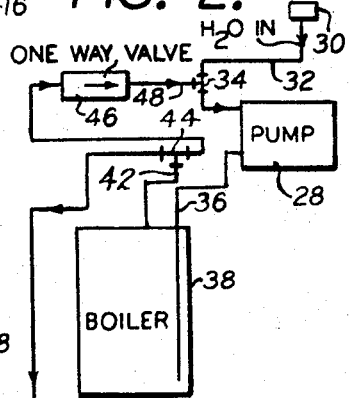
Figure 3:
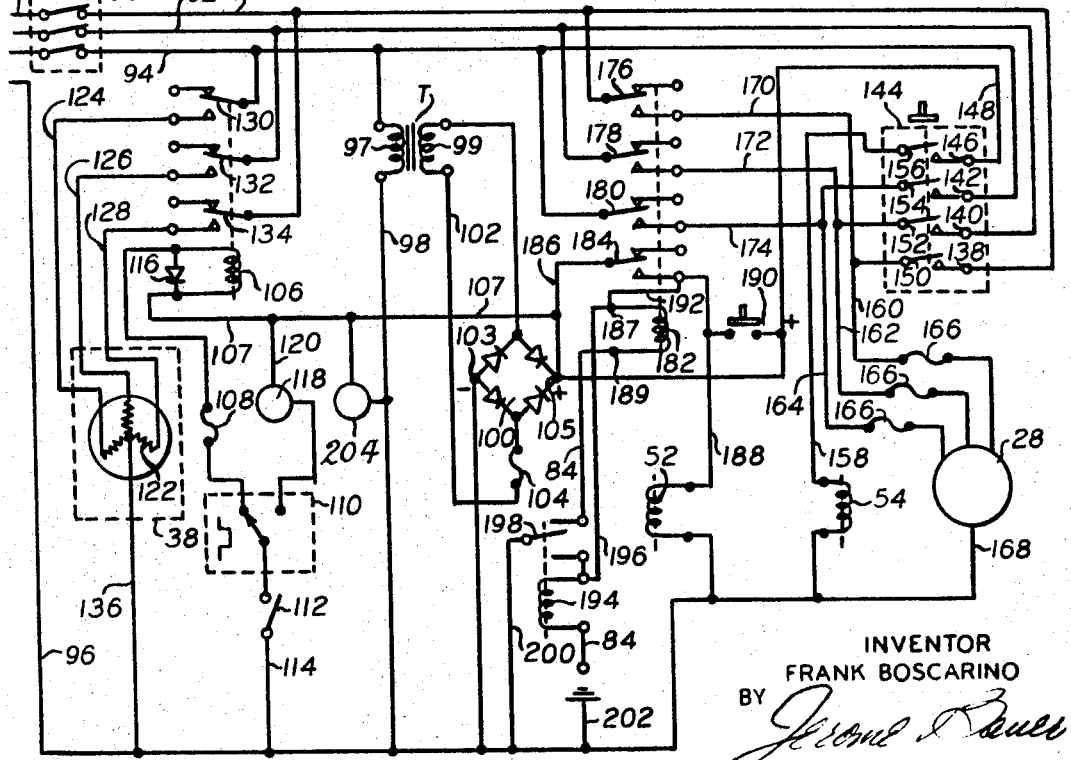

Other and further objects of this invention reside in the structures and arrangements hereinafter more fully described with reference to the accompanying drawings in which:

FIG. 1 is a perspective view of a beverage producing apparatus constructed according to the present invention, FIG. 2 is a schematic plumbing diagram of the apparatus shown in FIG. 1, and FIG. 3 is a schematic circuit wiring diagram of the apparatus of the present invention.

The coffee brewing apparatus constructed according to the present invention is designated generally by the numeral 10 in FIG. 1. The apparatus 10 includes a frame 12 having a front panel 14 and a rear panel 16 interconnected by a bottom wall 18. The bottom wall 18 is provided with depending side flanges 20 (only one of which is shown in FIG. 1); the bottom edges of which are flush with the bottom edges of the front and rear panels 14 and 16 so that the apparatus 10 may be supported on these edges. Opposed longitudinally extending brackets 22 and 24 connect the upper edges of the panels 14 and 16 to rigidify and strengthen the frame 12. Connected to the brackets 22 and 24 is a top wall 26. In practice the elements comprising the frame 12 are connected together with bolts and nuts (not shown) to facilitate construction of the frame and to facilitate the exchange of any one of the elements in a particular apparatus 10.

Mounted on the rear panel 16 adjacent to the top thereof is a fluid pump 28. The inlet of the pump 28 is connected to a nipple 30 through a tube 32 which includes a serially connected T 34 (FIG. 2). The nipple 30 is adapted to be connected to a source of fluid (not shown) such as water. The outlet of the pump 28 is connected to an inlet tube 36 of a boiler 38 mounted on and within the confines of the base 18, through a T 44, by a tube 40. The other side of the T is connected to the middle leg of the T 34, through a one-way valve 46, by a tube 48. A boiler outlet tube 42 is connected to the middle arm of a T 50. One side of the T 50 is connected to a normally closed solenoid actuated valve 52 and the other side of the T 50 is connected to a similarly normally-closed solenoid-actuated valve 54. A depending tube 55 communicates with the boiler 38 and is inclined forwardly and downwardly therefrom and terminates in a manually operated valve 57 shown in FIGS. 1 and 2. The tube 55 provides a path for the flow of the liquid in the boiler 38 when it is desired to drain the boiler by way of the valve 57.

The solenoid-actuated valves 52 and 54 are connected to respective spouts 56 and 58, which extend into and terminate in the area of a recess 60 in the front panel 14, by respective tubes 62 and 64. The recess 60 includes a bottom wall 66, a top wall 68, opposed side walls 70 and 72, and a rear wall 74. The spouts 56 and 58 extend downwardly through the top wall 68 of the recess 60 and terminate in spaced relation to the bottom wall 66. The spout 58 is adapted to dispense the liquid heated in the boiler 38. On the other hand the spout 56 is adapted to receive and be connected with a beverage producing ingredient container 76 of the type disclosed in U.S. Letters Patent No. 3,007,392, having a depending spout 78, on the end thereof so that the liquid traversing the spout 56 flows through the container 76 to produce the desired beverage thereby. In practice, the solenoid-actuated valve 52 is provided with a rate control means (not shown) because it is deemed conventional so that the rate of flow of the liquid through the container 76 may be selectively varied.

A metal cup, vessel or receptacle 80 is sized to be received within the recess 60 in upstanding relation to the bottom wall 66 so as to receive the liquid dispensed through either of the spouts 58 or 78. Extending forwardly from the rear wall 74 of the recess 60 is a tube 82 which overlies the open top of the vessel 80. A metal chain 84 extends through the tube 82 and downwardly into the vessel 80 and is spaced above the bottom wall thereof. The chain 84 is insulated from the walls of the tube 82 by appropriate means (not shown) and forms a portion of the electrical circuit of the present invention which is described in detail hereinbelow.

The circuit diagram of the present device is illustrated in FIG. 3 and includes a connector 86 that is adapted to connect the device to a three-phase four-wire source of potential, not shown. Connected to the connector 86 through a triple-pole single-throw switch 88 are respective leads 90, 92 and 94. A fourth lead 96 is connected directly to the connector 86 and serves as a ground for the circuit elements. The primary winding 97 of a transformer T is connected by lead 98 across the leads 94 and 96. The secondary winding 99 of the transformer T is connected across the input terminals of a full-wave diode bridge rectifier 100 by a lead 102, through a fuse 104.

One output terminal 103 of the rectifier 100 is connected to the ground lead 96. The other output terminal 105 of the rectifier 100 is connected to one terminal of the winding of a relay 106 by a lead 107. The other terminal of the winding of the relay 106 is connected by the lead 107, to a series circuit comprising a thermostat 108, a temperature sensitive switch 110, and through a single-pole single-throw switch 112 and a lead 114, to the lead 96. A diode 116 is connected across the terminals of the winding of the relay 106 to prevent arcing when the relay winding is deenergized. Additionally, a lamp 118 is connected between the lead 107 and the temperature-sensitive switch 110 and is positioned on the front panel 14 of the apparatus 10.

The boiler 38 is provided with a three-phase Y-connected heated element 122. The heater element 122 is connected across the leads 90–94 in conventional manner by respective leads 124, 126 and 128, through respective normally open contacts 130, 132, 134 of the relay 106. The center terminal of the Y-connected heater 122 is connected to the ground lead 96 by a lead 136.

The leads 90–94 are connected to the respective input terminals 138–142 of a four-pole single-throw push button switch 144 which is biased in the open position. The fourth input terminal 146 of the switch 144 is connected to the output terminal 105 of the rectifier 100 by a lead 148. Output terminals 150–156 of the switch 144 are adapted to be respectively connected to the input terminals 138–143 and 146 when the switch 144 is closed. The terminal 156 is connected, through the solenoid of the valve 54, to the lead 96 by a lead 158. The remaining output terminals 150–154 of the switch 144 are connected to respective input terminals of the motor or pump 28 by respective leads 160–164, through respective serially connected fuses 166. The ground return of the pump 28 is connected to the lead 96 by a lead 168. Thus, the leads 160–164 will be respectively connected with the leads 90–94 thereby to energize the pump 28 when the switch 144 is closed. Alternatively, the leads 160–164 are adapted to be respectively connected to the leads 90–94 by respective leads 170–174, through respective normally open contacts 176–180 of a relay 182. The relay 182 also includes a set of normally open contacts, one terminal of which is connected to the output terminal 105 of the rectifier 100 by a lead 186 and the other terminal of which is connected to lead 96, through the solenoid of the valve 52, by a lead 188. A normally open push button switch 190 is connected between the lead 188 and the lead 148.

One terminal 187 of the winding of the relay 182 is connected with the lead 188 by a lead 192. The terminal 187 is also connected to the chain 84 through the winding of a relay 194 by a lead 196. The other terminal 189 of the winding of the relay 182 is connected to the ground or return lead 96, through normally closed contacts 198 of the relay 194, by a lead 200. A lead 202 connects the metal bottom wall 66 of the recess 60 to the lead 96 so that the frame 12 is grounded.

To facilitate the operation of the apparatus 10, the switches 144 and 190 are positioned at the front panel 14 so that they are readily accessible. Additionally, the electrical elements such as the transformer T and the rectifier 100 are supported at the top wall 26 of frame 12. In operation, the connector 86 is connected to the source of potential and the switch 88 is closed thereby connecting the leads 90, 92, and 94 with the power source. The transformer T is energized through the circuit comprising the leads 94, 98 and 96. Accordingly, a DC potential appears between the terminals 103 and 105 of the bridge rectifier 100 and therefore, between the leads 107, 148 and 186, which are connected to the terminal 105, and the lead 96 which are connected to the terminal 103. A lamp 204 is connected between the leads 107 and 98 and it is positioned on the front panel 14 of the frame 12. Thus, the lamp 204 will be energized when the switch 88 is closed thereby to signify to the operator that the power has been applied to the apparatus 10. Thereafter, the container 76 may be filled with the desired beverage producing ingredient and the metal vessel 80 may be placed in position on the bottom wall 66 of the recess 60 with the metal chain 84 extending thereinto but in spaced relation to the walls thereof. The vessel 80 will be connected to the lead 96 since both the vessel 80 and the bottom wall 66 are fabricated from current conducting material and the bottom wall 66 is connected to the lead 96 by the lead 202.

The boiler 38 is initially filled with water by depressing either the switch 190 or the switch 144. For example, if the switch 190 is closed, the winding of the relay 182 will be energized through the circuit comprising the energized lead 148, switch 190, the leads 188 and 192, the said relay winding, the lead 200 and through the normally closed contacts 196 of the relay 194 and the lead 96. Thus, the contacts 176, 178 and 180 of the relay 182 will close thereby connecting the pump 28 with the energized leads 90–94 through the respective leads 160–164 and the respective leads 170–174 to energize the pump. Moreover, the contacts 184 will close thereby completing a holding circuit about the relay 182 through the lead 186, the contacts 184, the lead 192, the winding of the relay 182, the lead 200 and the closed contacts 198, and the lead 96. Thus, even though the switch 190 is depressed momentarily only, the relay 182 will remain energized through the aforementioned holding circuit. Additionally, the solenoid actuated valve 52 will be energized through the circuit comprising the energized lead 186, the contacts 184 of the relay 182, the lead 188 and lead 96 thereby to open the valve.

Accordingly, the pump 28 will pump water from the fluid source (not shown) through the tube 32, the tube 40 and the inlet tube 36 into the boiler 38. When the boiler 38 is filled, the fluid will flow through the outlet tube 42, the T 44, the T 50, the open valve 52, the tube 62, the spout 56, the container 76 and the spout 78 into the vessel 80. When the operator observes the dispensing of the fluid from the spout 78, thereby indicating the boiler 38 is full, he may momentarily touch the chain 84 to the side wall of the pot thereby energizing the winding of the relay 194 through the circuit comprising the energized lead 192, the lead 197, the said relay winding, the chain 84, the vessel 80 and the bottom wall 66, the lead 202 and the lead 96. Thus, the contacts 198 will open thereby breaking the holding circuit about the relay 182 and deenergizing the winding of the relay 182 to cause the associated contacts 176–184 to open. Thus, the solenoid-actuated valve 52 and the pump 28 will be deenergized. Additionally, the opening of the contacts 184 disconnects the winding of the relay 194 from the source of potential and, accordingly, the contacts 198 will assume their normally closed state.

As an alternative procedure, the boiler 38 may be filled by depressing the switch 144 to connect the terminals 138, 140, 142 and 146 with the respective contacts 150–156. This operation connects the leads 160–164 with the energized leads 90–94 to energize the pump 28. Additionally, the solenoid-actuated valve 54 will be energized through the leads 148, 158 and 96 to open the valve. Thus, the pump 28 will pump the water or fluid through the system in the aforementioned manner; however, instead of the fluid flowing through the valve 52 (which is now closed), the fluid will flow through the valve 54, the tube 64 and through the spout 58 directly into the vessel 80. When the operator observes the dispensing of the fluid, which indicates that the boiler is full, he releases the switch 144 thereby to deenergize the circuit elements and stop the pump 28.

The heating element 122 is energized by closing the switch 112. This causes the winding of the relay 106 to become energized through the circuit comprising the energized lead 107, the relay winding, the thermostat 108, the temperature sensitive switch 110, the switch 112, the lead 114 and the ground lead 96. Thus, the contacts 130–134 will close thereby connecting the leads 124–128 with the respective leads 90–94 to energize the heater element 122.

The temperature sensitive switch 110 is responsive to the temperature of the fluid in the boiler 38 and it is operable to connect either the thermostat 108 or the lamp 118 to the ground lead 96 (through the switch 112 and the lead 114). More particularly, at low temperature the switch 110 connects the thermostat 108 with the lead 114 to maintain the winding of the relay 106 energized. However, when the temperature in the boiler 38 uses above a preselected temperature (in practice, about 185° F.), the switch 110 breaks the circuit about the winding of the relay 106 and connects the lead 120 with the lead 114. Accordingly, the lamp 118 will be energized through the circuit comprising the lead 107, the lead 120, the lamp 118, the switches 110 and 112, and the leads 114 and 96. The illumination of the lamp 118 notifies the operator that the fluid in the boiler 38 has reached the desired temperature and that the fluid may be dispensed through the desired spout. When the temperature of the fluid in the boiler 38 falls below the preselected valve, the switch 110 changes back to its original state to cause the winding of the relay 106 to become energized thereby to energize the heater element 122 in the aforementioned manner. The thermostat 108 monitors the surface temperature of the boiler 38. When the surface temperature of the boiler exceeds a predetermined dangerous level, the thermostat 108 opens. Hence, the relay 106 will be deenergized and the contacts 130–134 will open thereby to disconnect the heater element 122 from the source of potential.

When it is desired to produce a beverage, the operator actuates the machine in the manner described above, and then waits until the lamp 118 is illuminated. The switch 190 is then momentarily depressed to energize the pump 28 and open the valve 52 in the manner noted above. Thus, the heated fluid will flow through the spout 56 and will leach through the beverage producing ingredient in the container 76, which may be coffee, and finally be dispensed into the vessel 80 as a beverage. It is to be noted that as the heated fluid is forced out of the boiler 38, fluid is being pumped thereinto by the pump 28. This operation will continue until the fluid in the vessel 80 contacts the chain 84. Thus, the metal chain 84 will be connected to the lead 96 through the beverage, the metal vessel 80 and the bottom wall 66, and the lead 202. The winding of the relay 194, accordingly, will be energized in the manner noted above thereby to deenergize the pump 28 and the valve 52. It will now be obvious that the volume of the beverage in the vessel 80 will be dependent upon the spacing between the bottom of the chain 84 and the bottom wall of the vessel 80. Accordingly, this spacing may be adjusted so that a preselected volume of the beverage is received in the vessel 80 before the chain 84 is contacted.

When it is desired to dispense the hot fluid only from the device of the present invention, the switch 144 may be closed. This will cause the energization of the valve 54 and the pump 28, in the above-disclosed manner, so that the hot fluid will be dispensed from the spout 58. Upon release of the switch 144; i.e., upon the opening thereof, the aforementioned elements will be deenergized thereby to stop the flow of the fluid. The vessel 80 may then be removed and the liquid therein may be distributed therefrom to the appropriate customers.

It is to be noted that at normal pressures the one-way valve 46 will remain closed so that the fluid entering the boiler 38 will flow toward the solenoid-actuated valves 52, 54. If, however, the pressure in the system increases above a preset level, for example, due to the clogging of a tube, the one-way valve 46 will open and the fluid will be pumped in a circulatory path comprising the pump 28, the tube 40, the T 44, the one-way valve 46, the tube 48 and the T 34 back to the pump 28. This arrangement consequently provides protection against the build-up of pressure without the necessity for a pressure release vent.

In order to empty the apparatus 10, the switch 88 is opened thereby to disconnect the source of potential from the circuit elements. The valve 57 (FIGS. 1 and 2) is then open and the fluid in the boiler 38 drains through the tube 55, which is inclined forwardly and downwardly to facilitate such draining, and the valve 57 into an appropriate container (not shown).

Accordingly, a beverage dispensing apparatus has been disclosed which is compact and which is substantially fully automated in its operation and which incorporates pressure safety devices therein without requiring a pressure release vent.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

What is claimed is:

1. In a beverage producing apparatus,
   a boiler having an inlet and an outlet for heating a fluid received therein,
   a pump having an inlet adapted to be connected to a source of fluid and an outlet connected to said boiler inlet and being operable to pump the fluid from the source to said boiler,
   valve means connected to said boiler outlet and being selectively operable between an open and a closed position for controlling the flow of the fluid from said boiler,
   dispensing means connected to said valve means for dispensing the fluid flowing through said valve means,
   energizing means for simultaneously connecting said valve means and said pump with a source of potential to operate said valve means to the open position and to cause operation of said pump whereby the fluid is dispensed from said dispensing means,
   disabling means responsive to the dispensing of a predetermined volume of fluid for disabling said energizing means,
   and pressure reducing means connected between said boiler and said pump and being responsive to a predetermined pressure for providing a path for the flow of the fluid from said boiler to said pump.

2. In a beverage producing apparatus as in claim 1,
   wherein said pressure reducing means comprises a one-way valve adapted to allow fluid to flow from said boiler inlet to said pump inlet in response to said predetermined pressure and to prevent the flow of fluid from said pump inlet to said boiler inlet.

3. In a beverage producing apparatus as in claim 1,
   wherein said dispensing means includes a container positioned in the path of the flow of the fluid adapted to hold a beverage producing ingredient therein whereby a beverage is dispensing from said dispensing means.

4. In a beverage producing apparatus according to claim 3,
   wherein said apparatus further comprises a second dispensing means,
   second valve means connected between said boiler outlet and said second dispensing means and being selectively operable between an open and a closed position to control the flow of the fluid from said boiler outlet to said second dispensing means,
   and second energizing means for simultaneously connecting said pump and said second valve means with a source of potential to operate said second valve means to the open position and to operate said pump whereby the fluid is dispensed from said second dispensing means.

5. In a beverage producing apparatus according to claim 1,
wherein said boiler includes a heating element,
relay means being selectively operable to connect said heating element with a source of potential to energize said heating element,
and signal means responsive to a predetermined temperature of the fluid in said boiler for producing a signal when said fluid has reached said predetermined temperature.

6. In a beverage producing apparatus as in claim 5,
wherein said signal means includes a lamp,
and a thermostatic switch for connecting said relay means with a source of potential to operate said relay means when the temperature of the fluid is below said predetermined temperature and for disconnecting said relay means and connecting said lamp with the source of potential when the temperature of said fluid is above said predetermined temperature.

7. In a beverage producing apparatus as in claim 1,
and drain means comprising a tube communicating with said boiler and extending forwardly and downwardly from the bottom of said boiler and terminating in a normally closed valve,
whereby said valve is adapted to be opened to drain said boiler of the fluid.

8. In a beverage producing apparatus as in claim 1,
wherein said energizing means includes relay means operable to connect said pump and said valve means across a source of potential,
said disabling means including switch means normally connecting said relay means across a relay energizing source to operate said relay means and being operable in response to the energization thereof to disconnect said relay means from the relay energizing source.

9. In a beverage producing apparatus according to claim 8,
and a receptacle fabricated from a current conducting material and adapted to receive the fluid dispensed from said dispensing means,
first means for connecting said receptacle with one terminal of a power source,
second means for connecting said switch means with the other terminal of the power source, said second means being adapted to be received in said receptacle in spaced relation to the walls thereof,
whereby the fluid received in said receptacle is adapted to connect said second means with said first means through the fluid and the receptacle thereby to connect said switch means across said power source to operate said switch means and disconnect said relay means from the relay energizing source.

10. A liquid dispensing apparatus comprising
a boiler having an inlet and an outlet for heating a fluid received therein,
a pump having an inlet connected to a source of liquid and an outlet connected to said boiler inlet and being operable to pump the liquid from the source to the boiler,
valve means connected to said boiler outlet and being selectively operable between an open and a closed state to control the flow of the liquid from said boiler,
energizing means operable to connect said valve means and said pump with a source of potential to open said valve means and to operate said pump whereby the liquid flows through said valve means,
and pressure reducing means connected between said boiler and said pump and responsive to a predetermined pressure for providing a path for the flow of the liquid from said boiler to said pump.

11. A liquid dispensing apparatus as in claim 10,
wherein said pressure reducing means comprises a one-way valve adapted to allow the passage of the fluid from said boiler inlet to said pump inlet in response to said preselected pressure and to prevent the flow of the liquid from said pump inlet to said boiler inlet.

References Cited
UNITED STATES PATENTS

| | | | |
|---|---|---|---|
| 2,639,078 | 5/1953 | Karlen | 99—282 X |
| 3,016,930 | 1/1962 | Dziedziula et al. | 99—282 X |

WILLIAM I. PRICE, Primary Examiner

U.S. Cl. X.R.

137—392, 565